(12) United States Patent
Lammerink

(10) Patent No.: US 6,370,950 B1
(45) Date of Patent: *Apr. 16, 2002

(54) MEDIUM FLOW METER

(75) Inventor: Theodorus Simon Joseph Lammerink, Enschede (NL)

(73) Assignee: Berkin B.V., Ruurlo (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,575

(22) Filed: Mar. 19, 1999

(51) Int. Cl.$^7$ ................................................ G01F 1/68
(52) U.S. Cl. ................................ 73/204.15; 73/204.26
(58) Field of Search .................... 73/204.15, 204.16, 73/204.17, 204.18, 204.26, 204.27

(56) References Cited

U.S. PATENT DOCUMENTS

| | | | | |
|---|---|---|---|---|
| 4,319,483 A | * | 3/1982 | Durham et al. ........... | 73/204.15 |
| 4,332,157 A | * | 6/1982 | Zemel et al. ............ | 73/204.16 |
| 4,480,467 A | * | 11/1984 | Harter et al. ............ | 73/204.15 |
| 4,527,427 A | * | 7/1985 | Grunwald ................ | 73/204.15 |
| 4,587,842 A | * | 5/1986 | Handtmann .............. | 73/204.14 |
| 4,688,424 A | * | 8/1987 | Handtmann et al. ..... | 73/204.16 |
| 4,984,460 A | * | 1/1991 | Isoda ...................... | 73/204.15 |
| 5,187,674 A | * | 2/1993 | Bonne .................... | 73/204.26 |
| 5,218,866 A | * | 6/1993 | Phillips et al. .......... | 73/204.15 |
| 5,285,673 A | * | 2/1994 | Drexel et al. ............ | 73/204.27 |
| 5,515,714 A | * | 5/1996 | Sultan et al. ............ | 73/204.26 |
| 5,852,238 A | * | 12/1998 | Vaitkus ................... | 73/204.11 |
| 5,852,239 A | * | 12/1998 | Sato et al. ............... | 73/204.26 |

* cited by examiner

Primary Examiner—Harshad Patel
(74) Attorney, Agent, or Firm—Young & Thompson

(57) ABSTRACT

The invention relates to a device for measuring the flow of a medium e.g., a gaseous medium or a fluid medium, which device is based on measuring and affecting the temperature distribution of a medium flowing along, which flow sensor comprises two object, each comprising a heating element and a temperature sensor, the measured temperature difference being kept, by way of a control loop, to the value of zero, the asymmetry of the power supply to the objects in order to comply with the aforesaid criterion, according to which the temperature difference must be zero, being representative of the value to be measured of the medium flow, taking into account parameters associated with the medium, such as its density and specific heat.

19 Claims, 16 Drawing Sheets

MEDIUM FLOW METER

INTRODUCTION

The invention presented relates to gas and/or fluid flow measurement techniques making use of thermal effects. Convection plays a role here: a moving medium entrains heat (energy) by way of its own heat capacity.

A known sensor, in which use is made of said property, is the anemometer. As a rule, the embodiment of such measuring device consists of one or more objects which are heated by a specific dissipated power and in which the flow affects the resulting temperature of said object. Said resulting temperature is a measure of the flow. Said embodiment and method are referred to as "Constant Power Anemometry" or simply CPA method. Also, said object may be kept at a constant temperature difference with respect to a reference temperature, and it may be measured which power to be dissipated is required for that purpose. Said embodiment and method are referred to as "Constant Temperature Anemometry" or simply CTA method.

Apart from this, the measuring devices based on thermal effects may be (mechanically or fluidally) broken down into three types:
(1) devices in which the object is entirely enclosed by the medium, as disclosed in U.S. Pat. No. 4,651,564 [R1, 1987] and in [R2, 1993];
(2) devices in which the object is not on all sides in touch with the medium, as extensively discussed in [R3, 1995]; and
(3) devices in which the object, contrary to (1), encloses the medium {the medium flows through a tubular device—the object), as disclosed in U.S. Pat. No. 5,036,701 [R4, 1990].

The known "hot-wire anemometry" measuring devices are of type (1), [R5, 1995].

An example of said type also is the method and device as disclosed in [R1, 1993], in which the power dissipated in the object is kept constant (CPA), and in which the temperature (distribution) around the object referred to earlier is then considered.

HEAT BALANCE OF AN OBJECT

The invention relates to the control of the temperature of objects which are in thermal interaction with the environment. To support the specification of the invention, the so-called heat balance of an object is first gone into.

The behaviour of an object (having on it e.g., a temperature sensor and/or a heating element) in a thermal interaction with the environment may be studied by considering the heat balance of said object.

The heat balance refers to the circumstance that the increase of the heat Q (energy dimension) stored in the object equals the heat transmitted to it ($P_{in}$) or generated within the object ($P_{gen}$), minus the heat dissipated ($P_{out}$) and absorbed within the object ($P_{abs}$):

$$\frac{dQ_{obj}}{dt} = P_{in} + P_{gen} - P_{out} - P_{abs} \tag{F1}$$

For the sake of clarity of the further specification, it is assumed that the internal heat absorption (e.g., such as the one by way of an internal chemical reaction or a phase transition) equals zero ($P_{abe}=0$).

The heat capacity of the object ($C_{obj}$) determines the relationship between the stored heat (energy) and the temperature of said object ($T_{obj}$):

$$T_{obj} = \frac{Q_{obj}}{C_{obj}} \tag{F2}$$

The heat balance of an object then becomes:

$$\frac{dQ_{obj}}{dt} = P_{gen} + P_{in} - P_{out} \tag{F3}$$

$$\frac{dT_{obj}}{dt} = \frac{P_{gen} + P_{inout}}{C_{obj}}$$

with $P_{inout}=P_{in}-P_{out}$ (F3)

Said latter formula or differential equation for $T_{obj}$ may be written in the form of an integral:

$$T_{obj} = \frac{1}{C_{obj}} \int (P_{gen} + P_{inout}) dt \tag{F4}$$

An object is in equilibrium with the environment if $T_{obj}$= constant (no longer depending on time). Therefore, the following applies to said object:

$$P_{gen}+P_{inout}=0, \text{ or } P_{gen}=-P_{inout}.$$

From this, it is obvious that, for a situation in which the temperature of the object ($T_{obj}$) is constant there exists a balance between the internally generated power $P_{gen}$ and the incoming and outgoing power $P_{inout}$.

TEMPERATURE OF AN OBJECT

The temperature of an object which is in thermal interaction with the environment having a flowing medium, in equilibrium has a temperature which may be expressed as follows:

$$T_{obj} - T_m = \frac{P_{gen}}{A + B\sqrt{|v|}} \tag{F5}$$

where $T_{obj}$ is the object temperature, $T_m$ is the medium and environmental temperature, $P_{gen}$ is the heat generated within the object, A is a constant representing the heat conduction from the object to the environment, B is a constant representing the influence of the convection of the medium on the object temperature, and v is the flow rate of the medium.

Here, four items of interest are distinguished:
1 For a given and fixed $P_{gen}$, A, B and v, the (absolute) temperature of the object is directly proportional to the temperature $T_m$ of the medium.
2 For a given and fixed A, B and v, the temperature difference $T_{obj}-T_m$ is proportional to the internally generated heat $P_{gen}$: $T_{obj}-T_m$=constant.$P_{gen}$
3 The proportionality constant is referred to as the "flow sensitivity" of the object: $T_{obj}-T_m=G(v).P_{gen}$
4 Only the size of the flow affects the temperature and not the sign (positive or negative direction).

BRIEF DESCRIPTION OF THE FIGURES

In FIG. 3, it is shown that, with an object in the CTA mode, there can be measured no direction of the flow.

Figure 33:
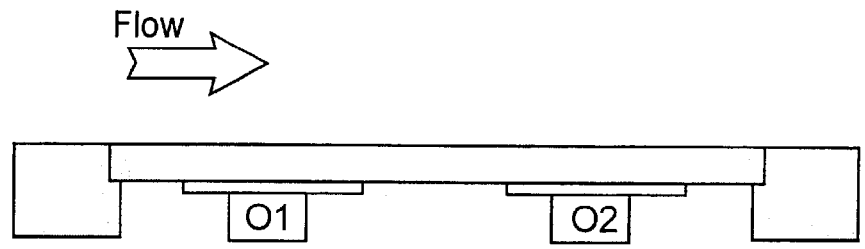
Figure 34:
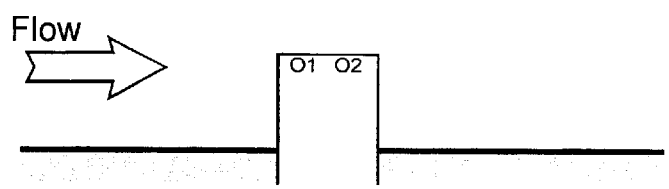
Figure 35:
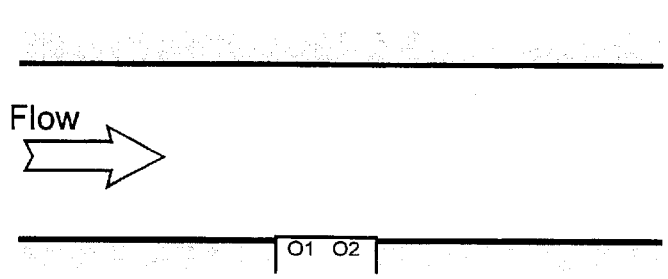

In figures FIGS. 33, 34 and 35, there is given an embodiment of a measuring device based on this invention, in which the two objects are separated from the medium by a thin partition. The objects have a thermal interaction with the medium.

Figure 36:
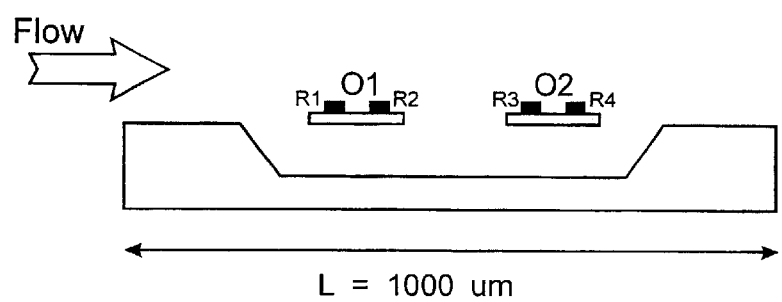
Figure 37:
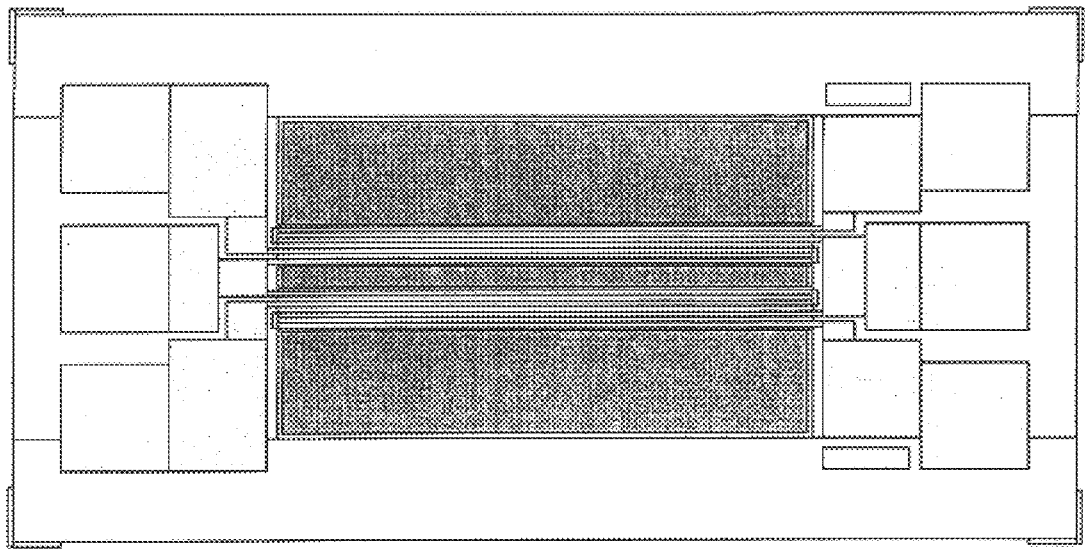

In FIG. 36 (cross section) and FIG. 37 (plan view), there is given an embodiment of a flow meter based on this invention, consisting of a semiconductor structure.

Figure 38:
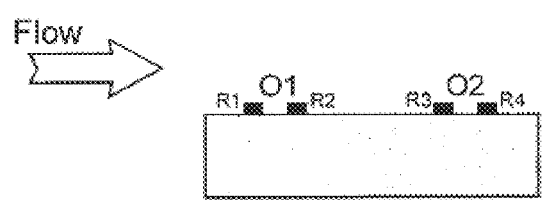

FIG. 38 shows a cross section through a synthetic carrier having on it two objects, each comprising two resistance elements.

Figures 39A, 39B:
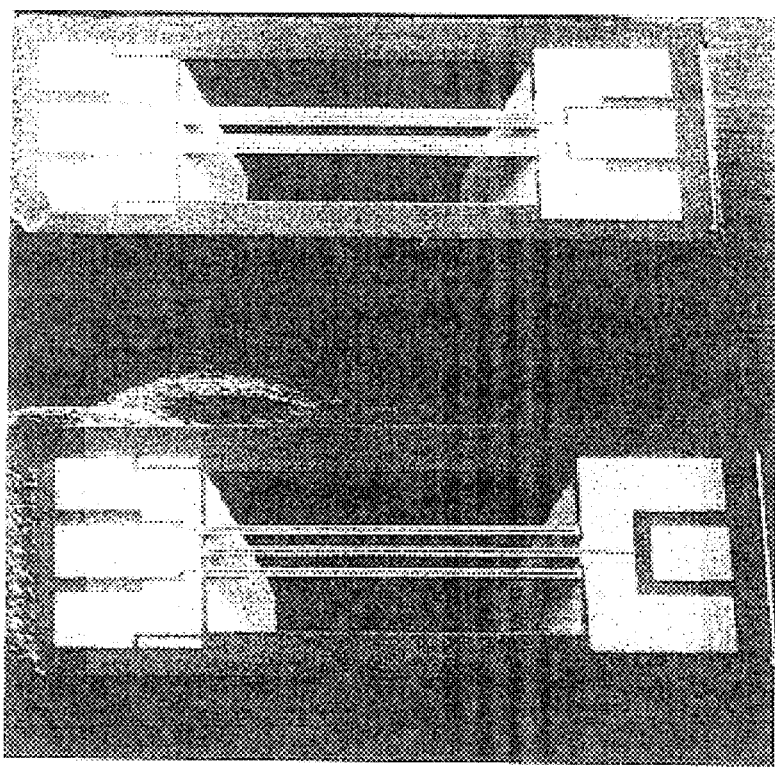

FIG. 39a shows a photograph of an embodiment having two objects, each with two resistance elements, in conformity with the figures FIGS. 36 and 37.

FIG. 39b shows a photograph of an embodiment having three objects, each with one resistance element.

BACKGROUND OF THE INVENTION

Flow meters, type: X

Figure 1:
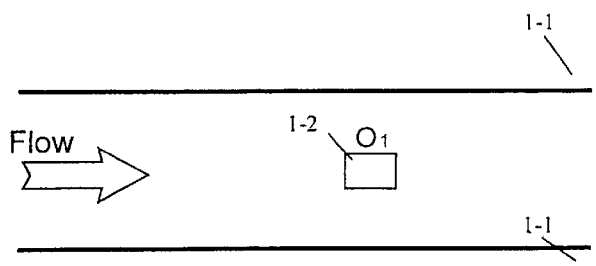
In FIG. 1, there is given a cross section of a flow-measuring device. The medium flows through a tubular device (1-1). The object $O_1$ under consideration (1-2) is surrounded by the medium.
Figure 2:
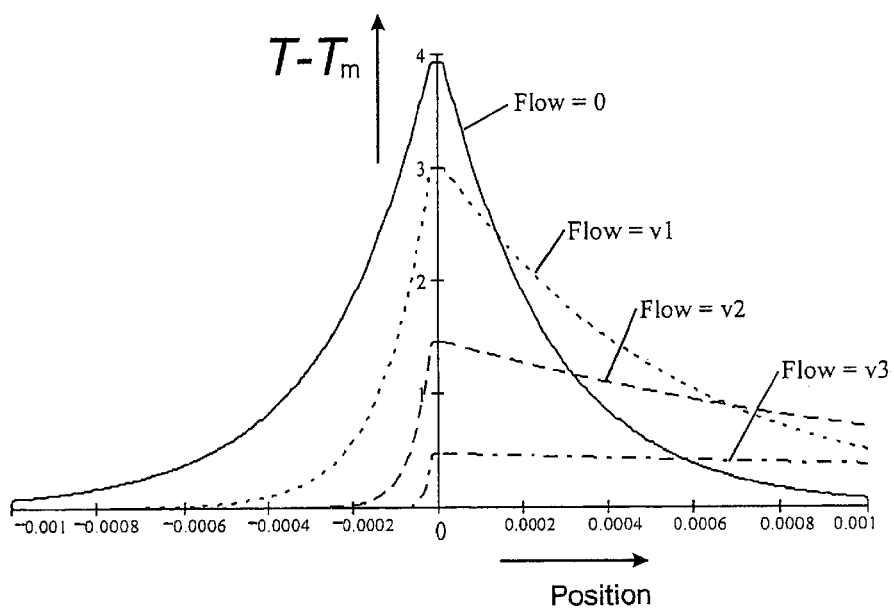
In FIG. 2, the local (medium) temperature around the object (with respect to $T_m$=environmental medium temperature) is given as a function of the position. The object was in position x=0. The dissipated power ($P_{gen}$) in the object is constant (CPA method).

A basic outline of this type of medium flow-measuring devices is shown in FIG. 1.

Figure 3:
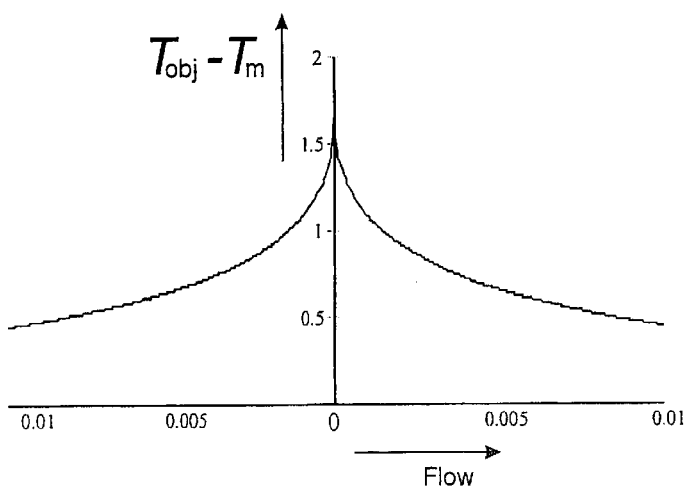
In FIG. 3, the object temperature with respect to medium $T_m$ is given as a function of the flaw having a design as shown in FIG. 1.
Figure 5:
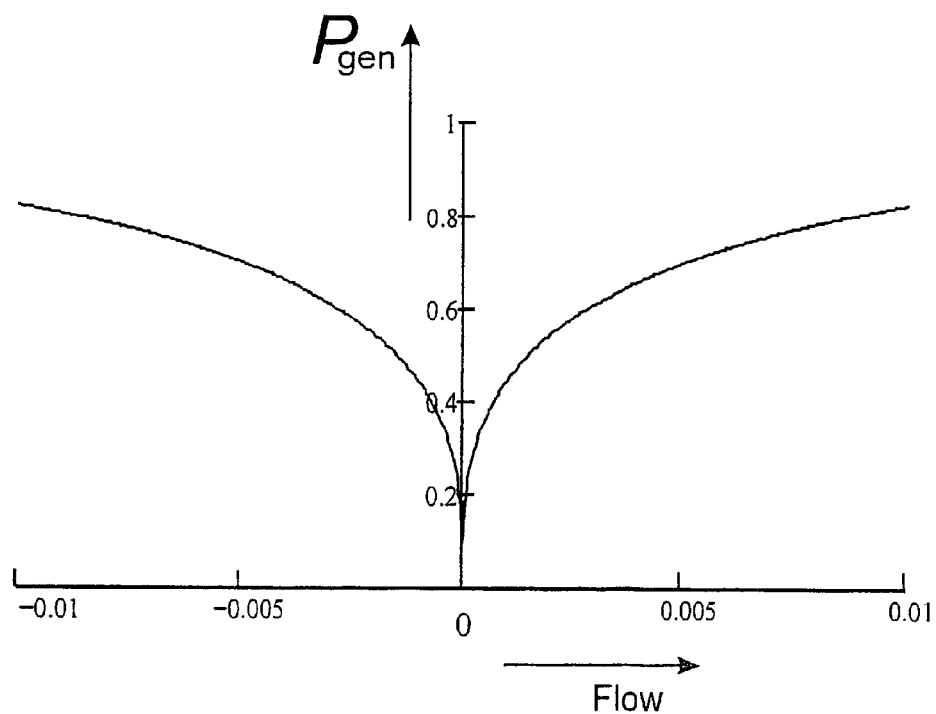
In FIG. 5, there is given the power $P_{gen}$ required to control the object at a fixed temperature with respect to the medium. At a fixed absolute object temperature, $P_{gen}$ is a function of the medium temperature. The measuring device is outlined in FIG. 6.

They consist of an object which is in equilibrium with the environment. For these types, there are used both the CPA method (FIG. 3) and the CTA method (FIG. 5).

In the CPA mode, the medium temperature directly affects the object temperature.

In the CTA mode, the medium temperature directly affects the $P_{gen}$ to keep the absolute object temperature constant.

In either mode, it is no longer possible to extract the direction (positive or negative) of the flow from the output signal of the measuring device.

These are known drawbacks of this type of flow-measuring device.

Flow meters, type: XX

Figure 6:
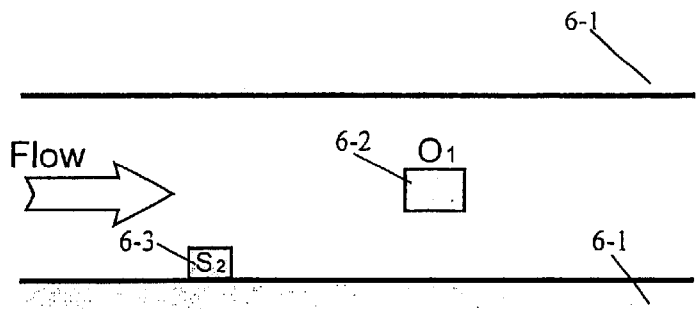
In FIG. 6, there is given a cross section of a flow-measuring device. The medium flows through a tubular device (6-1). The object $O_1$ under consideration (6-2) is surrounded by the medium. The medium temperature is measured using a sensor $S_2$ (6-3).

A basic outline of this type of medium flow-measuring device is shown in FIG. 6. The medium temperature is measured using an additional sensor.

For these types, once again there are used both the CPA method (FIG. 3) and the CTA method (FIG. 5).

For type XX, a major drawback of flow meters of the type X is overcome, since the medium temperature is now known.

It still is no longer possible to extract the direction (positive or negative) of the flow from the output signal of the measuring device.

This is a known drawback of this type of flow-measuring device.

Flow meters, type: XXX

Figure 7:
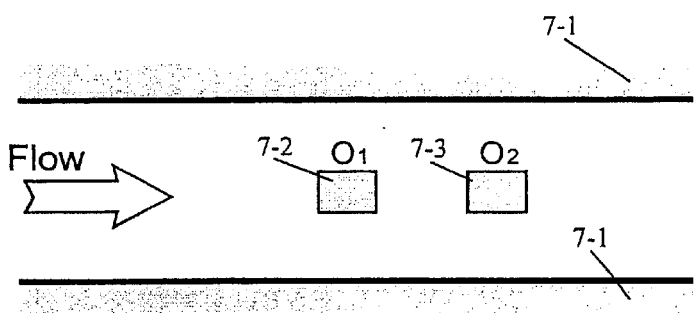
In FIG. 7, there is given a cross section of a flow-measuring device having two objects. The medium flows through a tubular device (7-1). Two objects $O_1$ (7-2) and $O_2$ (7-3) are surrounded by the medium.
Figure 8:
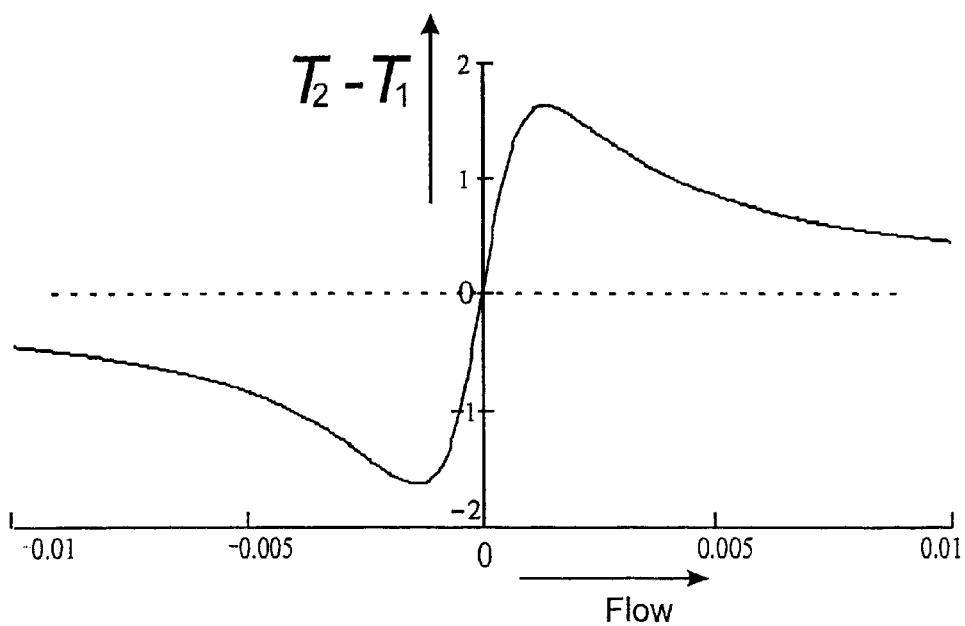
In FIG. 8, the temperature difference between the two objects $O_1$ (7-2) and $O_2$ (7-3) of FIG. 7 are outlined as a function of the flow of the medium.

A basic outline of this type of medium flow device is shown in FIG. 7. For this type, there are used two objects.

Now, both objects are used as outlined earlier for type X. The use of this type in the CPA method is known. Now, it is possible to determine the direction of the flow. A known example of this type is the "microflown" [R6, 1995; R7, 1997]. The output signal is a function of the temperature difference between the two objects. A known drawback is that the zero point of this type of measuring device strongly depends on the medium temperature. Another known drawback is that for higher flow values, the temperature difference between the two objects declines again.

Also, for this type, the CTA method is used by keeping object $O_1$ (7-2) at a constant temperature difference (not equalling zero) with the other object $O_2$ (7-3). In this case, a drawback is that the measuring device now acts for flow in one direction only.

Flow meter, type: IV

Figure 9:
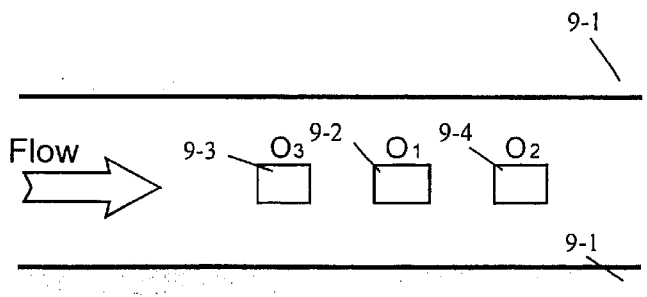
In FIG. 9, there is given a cross section of a flow-measuring device. The medium flows through a tubular device (9-1). In the tube, three objects $O_1$ (9-2), $O_2$ (9-4), and $O_3$ (9-3) are surrounded by the medium.
Figure 10:
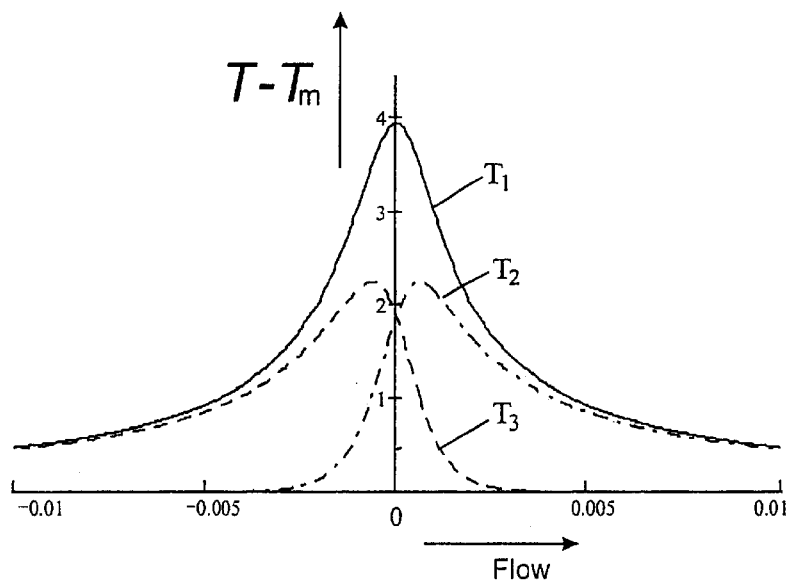
In FIG. 10, there is given the temperature of the three objects—$T_1$ for $O_1$, $T_2$ for $O_2$, and $T_3$ for $O_3$ (always with respect to the medium temperature)—as a function of the flow of the medium. The measuring device is given in FIG. 9. The object $O_1$ (9-2) is heated with a constant power $P_{gen}$. Object $O_2$ (9-4) and object $O_3$ (9-3) are not heated.
Figure 11:
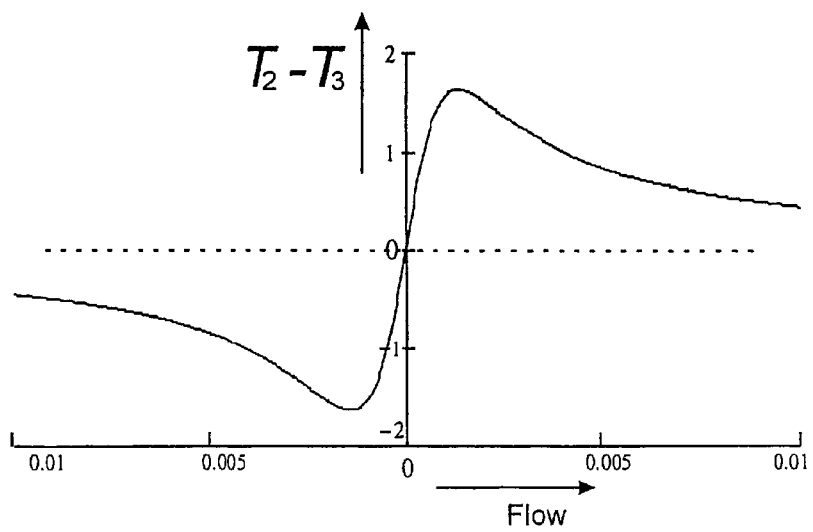
In FIG. 11, the temperature difference of the objects $O_2$ (at $T_2$) and $O_3$ (at $T_3$) is given as a function of the flow of the medium. Object $O_1$ is driven with a constant power (object $O_1$ in the CPA mode).

There is known a flow-measuring device having three objects in the medium, as shown in FIG. 9. An example of this type is the Lammerink device [R3, 1993]. Here, use is made of the CPA method. The temperature as a function of the position is given in FIG. 10. The temperature difference between the two objects $O_2$ (9-4) and $O_3$ (9-3), is outlined in FIG. 11. The output signal is a function of the temperature difference between two objects. A known drawback is that the zero point of this type of measuring device strongly depends on the medium temperature, Another known drawback is that, for higher flow values, the temperature difference between the two objects (see FIG. 11) declines again.

Figure 4:
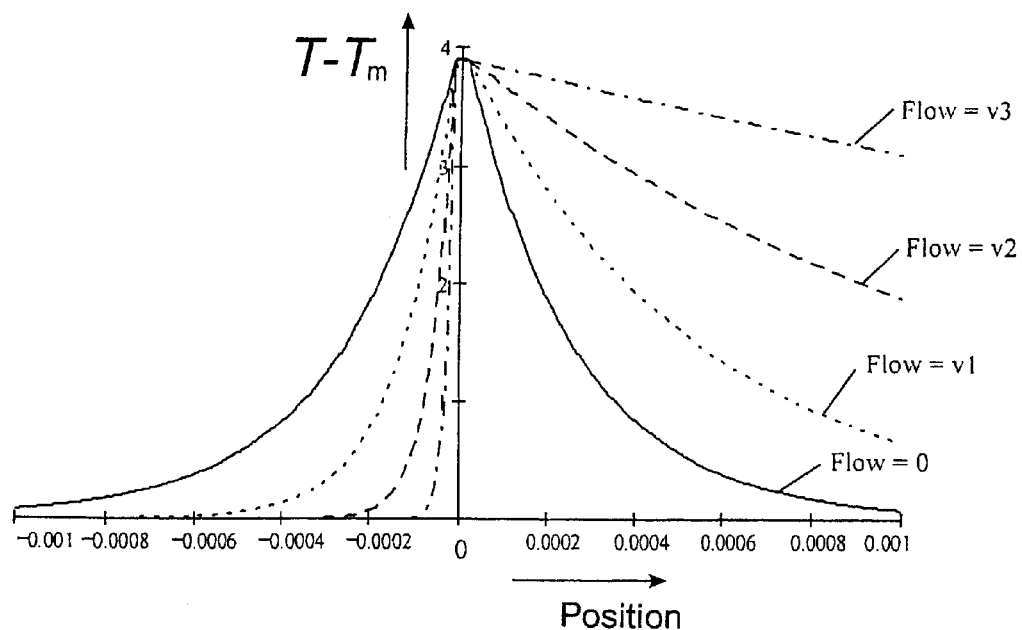
In FIG. 4, the local temperature around the object as a function of the position is given for a device such as the one outlined in FIG. 6. The dissipated power ($P_{gen}$) in the object is controlled in such a manner that the temperature difference between the object and the medium temperature is constant (CTA method). To realise this, it is required that the medium temperature be measured with an additional temperature sensor (for this purpose, see FIG. 6).
Figure 12:
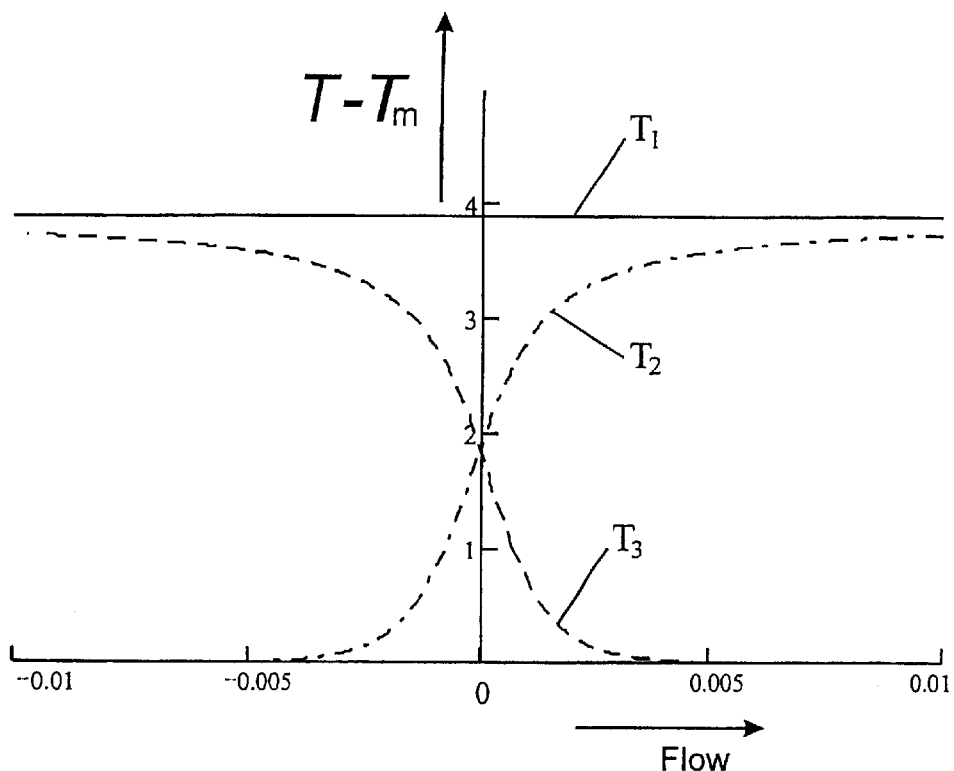
In FIG. 12, the temperature is indicated for three objects in a measuring device such as the one outlined in FIG. 9. The object $O_1$ (9-2) is heated with such a power $P_{gen}$ that the temperature $T_1$ of the object $O_1$ (9-2) is kept at a constant value over that of the medium. Once again, there is required an additional sensor here which is not shown in the figure. Object $O_2$ (9-4) and object $O_3$ (9-3) are not heated directly.
Figure 13:
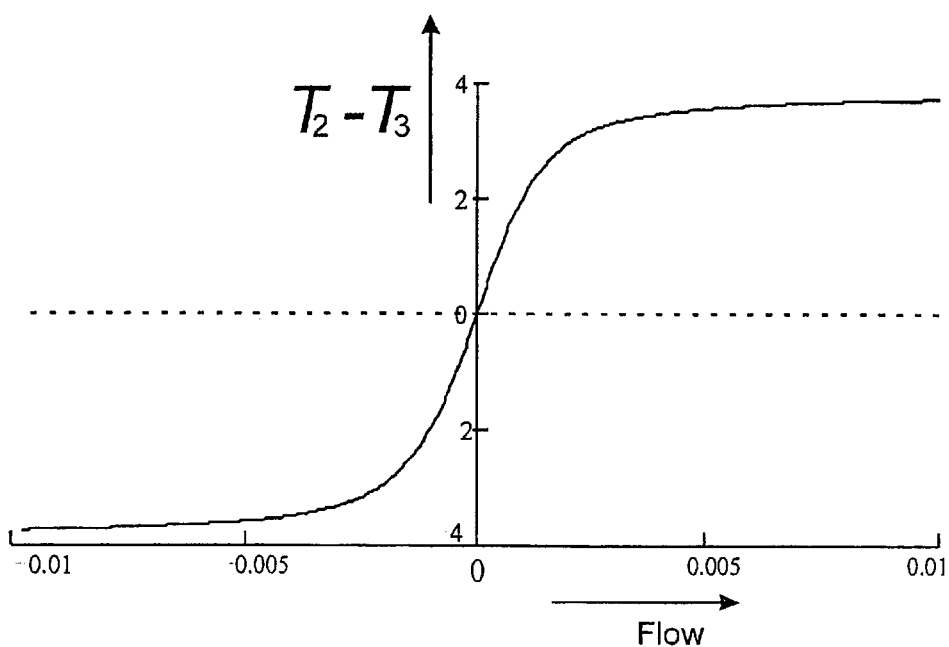
In FIG. 13, the temperature difference between the two objects $O_2$ (9-4) and $O_3$ (9-3) is shown as a function of the flow of the medium.

The use of object $O_1$ (9-2) in the CTA mode is known. The temperature distribution as a function of the position then strongly resembles the one shown in FIG. 4. The temperatures of the three objects as a function of the flow is shown in FIG. 12. In FIG. 13, there is shown the temperature difference between the objects $O_2$ (9-4) and $O_3$ (9-3). A known drawback is that the zero point of this type of measuring device strongly depends on the medium temperature.

Also known is the measuring device as described in U.S. Pat. No. 4,651,564 [R2, 1987]. In this device, use is made of two objects in the medium. There is made use of one heating element which is distributed among the two objects. Apart from this, both objects have a temperature-dependent resistance for a temperature sensor. A drawback is that it is not possible to adjust the dissipated power in both objects independently from one another.

There is known a measuring device as described by Van Putten [R8, R9]. Using one construction having several resistance elements, the flow in two perpendicular directions is measured.

A drawback here is that the dissipated power in the heating elements is not independently adjustable.

There is known a method as described by Huijsing [R10] to keep the temperature of an object constant (CTA mode). Said method may be applied to this invention in order to adjust the temperatures of both objects and thereby is an example of a controller. A drawback of said method is that it is coupled to a digital clock signal and that it is a so-called "synchronous" digital circuit.

INVENTION

Figure 14:
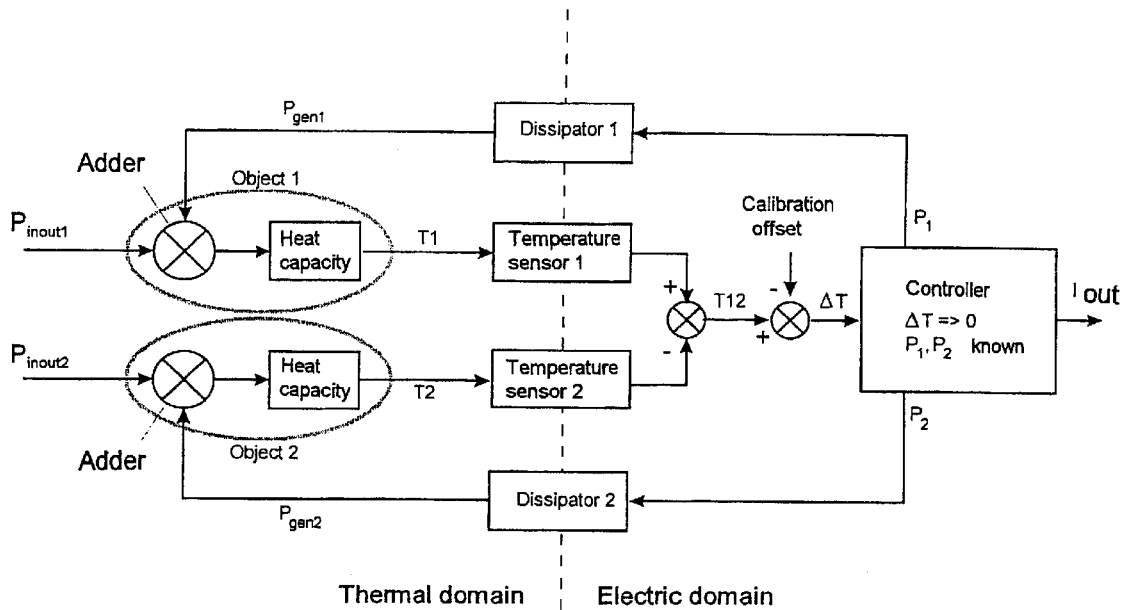
In FIG. 14, there is shown a block diagram of the proper invention. The invention is extensively discussed in the further specification.
Figure 15:
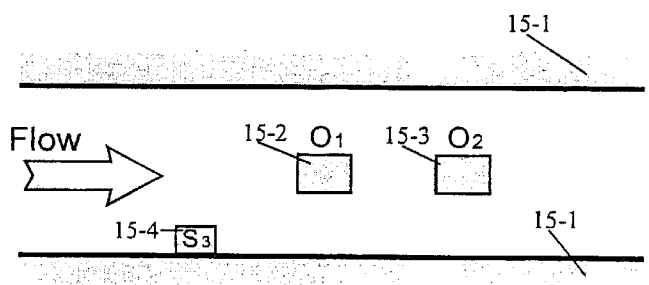
In FIG. 15, there is given a cross section of a flow-measuring device having two objects. The medium flows through a tubular device (15-1). The two objects $O_1$ (15-2) and $O_2$ (15-3) are surrounded by the medium. The medium temperature may be measured using a sensor $S_4$ (15-4).

A block diagram of the proposed invention is shown in FIG. 14. An embodiment for the construction using two objects in a tubular construction is shown in FIG. 15.

The proposed invention makes use of two objects which have a thermal interaction with their environment which is affected, one way or another, by the flow.

The objects each have a heat supply using at least one actuator or dissipator, and the objects have at least one temperature sensor for measuring the object temperature.

Also, the proposed invention includes an analogue or digital controller (proportional or not) which sees to it that, by way of generating heat in the object dissipators, the temperature of the objects is adjusted in such a manner that the temperature difference between both objects becomes zero.

In the further application, a dissipator refers to a heat source which converts electric power into heat. This is a functional name and a functional concept. The function may be carried out by an "electric resistance", but also by an "active element" such as, e.g., a transistor, a bipolar element, NPN, PNP, MOST, FET, IGBT etc., or a diode, or e.g., a Peltier element (having the property of a possible negative heat flow; cooling).

The objects each have a temperature sensor which is used to measure the object temperature. The temperature measurement, too, is represented as a function. The word "sensor" is a functional name. The temperature sensor need not necessarily be a (temperature-dependent) resistance, but may be any element having said function (there are known, inter alia, (semiconductor) elements, such as resistances, transistor, bipolar elements, MOST, CMOST, IGBT, and other majority/minority charge-carrier elements, such as diodes and resistances). Thermocouples may also serve as temperature sensors.

The detailed specification of the invention follows by reference to FIG. 14. The controller generates (electric) powers $P_1$ and $P_2$. Said electric powers are converted by the dissipators into heat flows $P_{gen1}$ and $P_{gen2}$. The objects each have a heat capacity by which both total heat flows (($P_{gen1}$+$P_{inout1}$) and ($P_{gen2}$+$P_{inout2}$)) are integrated into physical object temperatures $T_1$ and $T_2$. By way of the heat flows $P_{inout1}$ and $P_{inout2}$, the objects have their thermal interaction with the environment and with the medium to be measured.

Both object temperatures are measured using temperature sensor1 and temperature sensor2, and convert the physical temperatures into electric signals. By subtracting said signals from one another, there is produced the electric signal T12. From this signal, the electric signal $\Delta T$ is formed by way of an optional calibration-offset circuit. The offset circuit is extensively discussed hereinafter. For now, we assume calibration offset=0.

Figure 16:
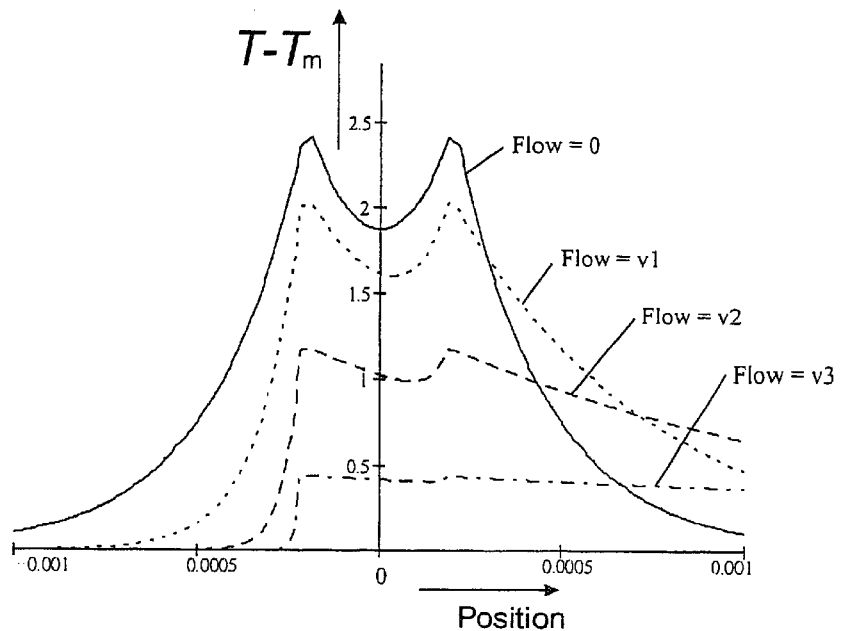
In FIG. 16, the temperature distribution as a function of the position is given for a measuring device such as the one shown in FIG. 15. The temperature distribution is given for four values of the flow (Flow=0, Flow=v1, Flow=v2, Flow=v3). The temperature of the two objects $O_1$ (15-2) and $O_2$ (15-3) is kept at a temperature difference of $T_1-T_2=0$ using a controller.

As a result of the operation of the controller, the temperatures of the two objects will be equalised to one another. This leads to temperature distributions in the neighbourhood of the objects as a function of the position, as shown in FIG. 16 and in FIG. 17.

Figure 18:
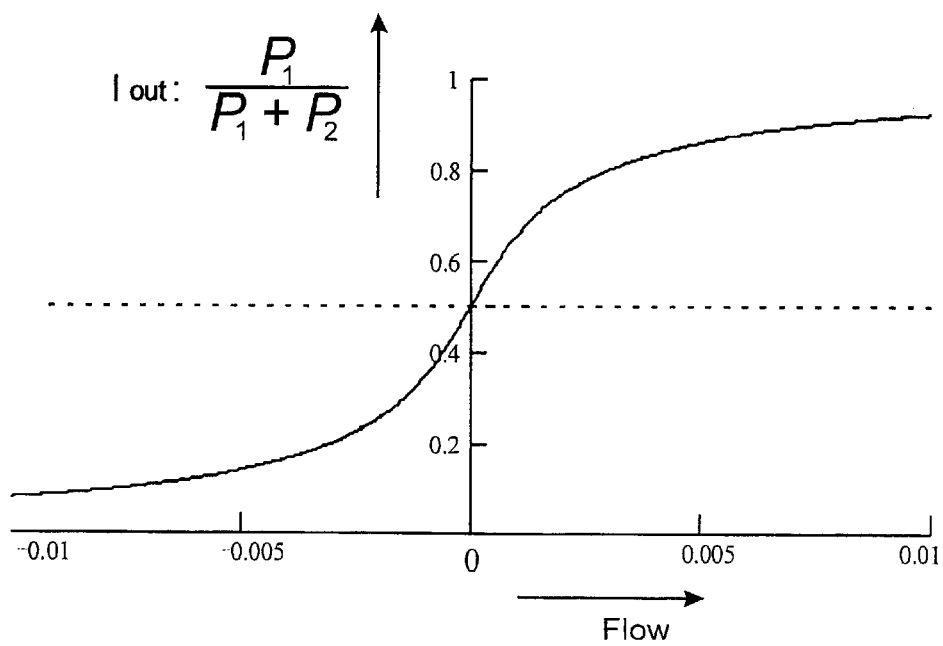
In FIG. 18, there is outlined the ratio $P_1/(P_1+P_2)$ of the powers $P_1$ ($P_{gen}$ of object 1) and $P_2$ ($P_{gen}$ of object 2) which are output by the controller to keep the temperature difference of $T_1-T_2$ at zero.
Figure 19:
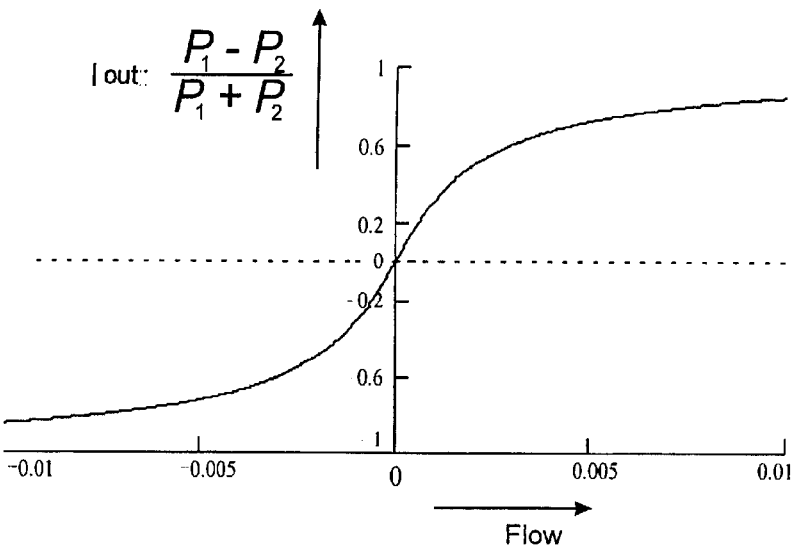
In FIG. 19, there is outlined the ratio $(P_1-P_2)/(P_1+P_2)$ of the powers $P_1$ ($P_{gen}$ of object 1) and $P_2$ ($P_{gen}$ of object 2) which are made available by the controller to keep the temperature difference of $T_1-T_2$ at zero.

The two temperatures of the two objects $T_1$ and $T_2$ are equal (or are adjusted to become equal). For a specific flow, the heat flows $P_{gen1}$ and $P_{gen2}$ (see (F5)) which are required for this purpose, differ for the two elements. In the-event of a positive flow, object2 experiences a flaw of a medium which is already preheated by object1. The asymmetry in the two heat flows is a measure of the flow. Apart from the control powers $P_1$ and $P_2$, the controller also supplies an "information signal"—$I_{out}$—to the output. The output signal $I_{out}=P_1/(P_1+P_2)$ is shown in FIG. 18. The output signal $I_{out}=(P_1-P_2)/(P_{1+P2})$ is shown in FIG. 19.

An advantage of the invention described is that the electric output signal outlined in FIG. 18 (and in FIG. 19) in a first approximation is independent from the total power $P_{tot}=P_1+P_2$ dissipated in both objects together.

Initially, the output signal associated with a CPA (Constant Power Anemometry: $P_{tot}=P_1+P_2$=constant, $\Delta T=0$; temperature distribution of FIG. 17) is equal to the output signal associated with CTA (Constant Temperature Anemometry $T_1,T_2$=constant, $\Delta T=0$; temperature distribution of FIG. 17).

In a first approximation, the output signal does not depend on the temperature of the objects, nor on the total power dissipated in the objects, but only on the flow of said medium.

Another advantage of the invention is that, in the CTA mode, the sensitivity of the temperature sensors does not affect the output signal ($I_{out}$) of the controller.

A well-known problem is the systematic error in the electric temperature-difference signal T12 (see FIG. 14). Said systematic error may be prevented by making use of two thermocouples or a thermopile (see FIG. 26) as a temperature(-difference) sensor. Due to the nature of the thermo-couples or thermopiles, these have no systematic offset error.

Making use of this type of temperature sensor in the proposed invention, there is obtained a "natural" zero point for the flow-measuring device, without a systematic error.
Calibration option The control criterion is to adjust the physical temperature difference between the two objects to zero. By, in a calibration procedure, bringing the controller to a calibration mode and at the same time equalising the two powers $P_1$ and $P_2$ to zero—$P_1$=0,$P_2$=0—the two objects will cool down and, after a certain time interval, assume the temperature of the medium and the environment and therefore automatically become mutually equal (without active controller), so that $T_1=T_2$. This will also occur in a—flowing—medium.

After the cooling-down period, so that $T_1=T_2$, the electric signal T12 may be measured and the "calibration offset" may be made such that the electric signal $\Delta T$=0. After the calibration phase, said . . . "calibration offset" . . . value may be used as a compensation of the systematic error of the temperature sensors.
Self-analysis Since the controller is capable of resetting $\Delta T$ to zero, it is also clear when this aim is not attained. The attaining, or not, of the directly imposed aim constitutes a criterion for the operation of the flow measurement, and this information may be used as such.

It should be noted that the output signals, as drawn in figures FIG. 18 and FIG. 19, partly depend on various parameters associated with the medium, such as the density of the medium, the specific heat of the medium, and the flow rate.

EMBODIMENTS

The invention includes various embodiments relating to the electric circuit and the controller, as well as the construction of the objects relating to the flowing medium.

First, there will be described seven electric embodiments of the invention with reference to FIG. 20 up to and including FIG. 26.

Figure 24:
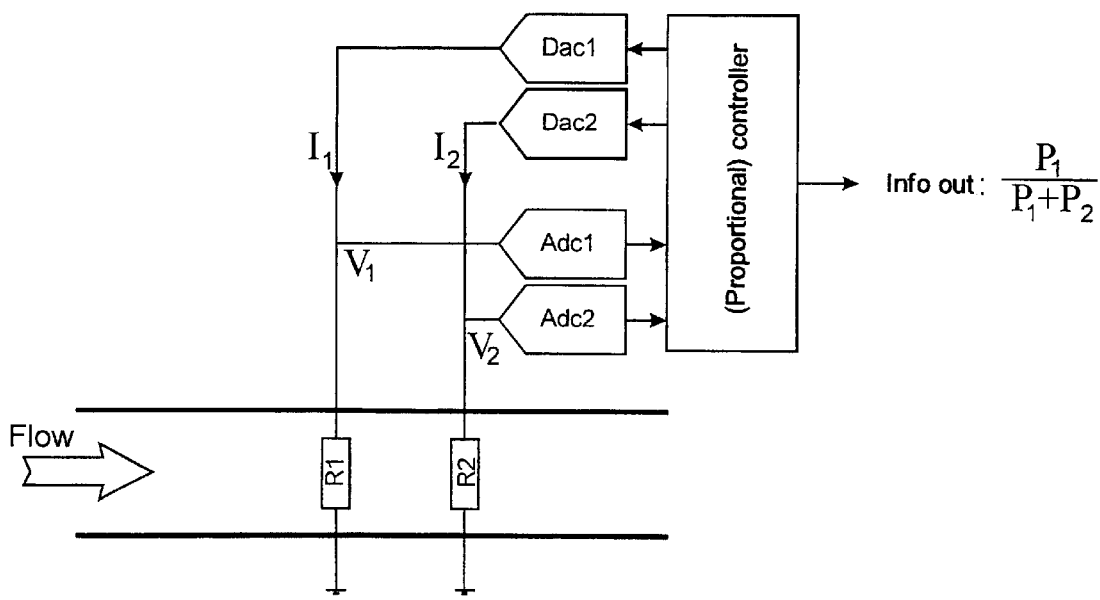
In FIG. 24, there is given a fifth embodiment of the electric circuit. This figure, too, is extensively discussed hereinafter in the specification.

A generic embodiment of the invention is shown in FIG. 24. Here, two temperature-dependent resistances are used as objects. The objects are surrounded by flowing medium. By applying the electric currents $I_1,I_2$ and measuring the resulting voltages $V_1,V_2$, the controller knows the powers ($P_{gen1}=I_1*V_1$) and ($P_{gen2}=I_2*V_2$) dissipated and generated in the two objects. The controller also knows the temperature of the two objects by simultaneously determining $V_1/I_1=R_1$ and $V_2/I_2=R_2$.

In the controller, there may also be implemented a calibration procedure with the purpose of, during said procedure, halting the controller, resetting the powers $P_1$ and $P_2$, detecting the systematic error, and recording it by way of a calibration-offset value.

There is drawn a digital controller (proportional or not) having two analogue/digital converters and two digital/analogue converters. The proposed controller may also be designed in analogue form, the four converters referred to then being cancelled.

Figure 20:
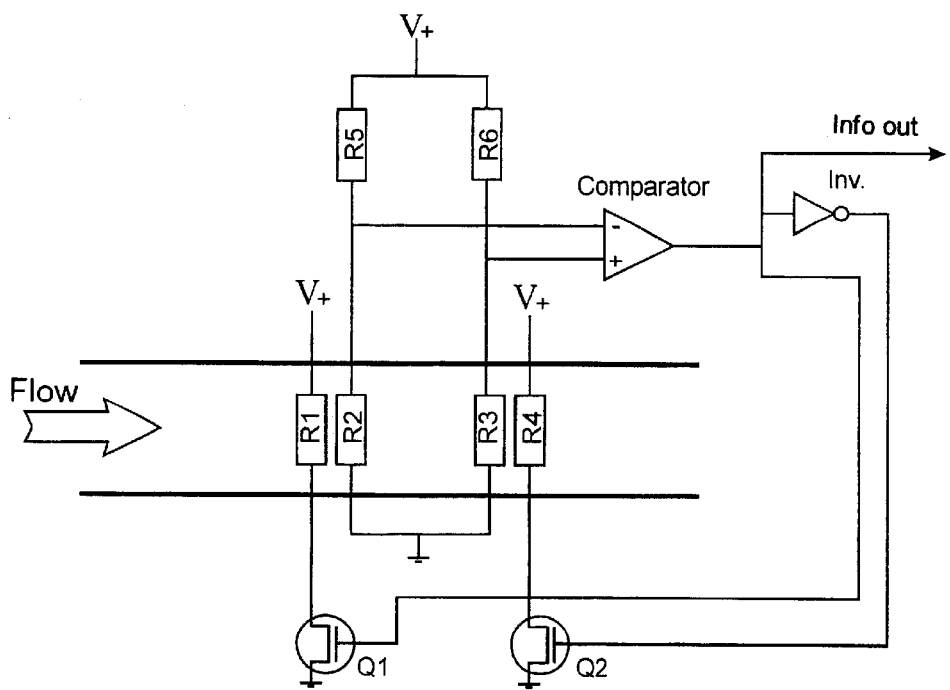
In FIG. 20, there is outlined a measuring device having two objects in the medium. R1–R2 together form object $O_1$ and R3–R4 together form object $O_2$. There is also outlined an electronic circuit which acts as a controller to set the temperature difference of $T_1-T_2$ at zero (as outlined in FIG. 14). The figure is extensively discussed hereinafter in the specification.
Figure 20:
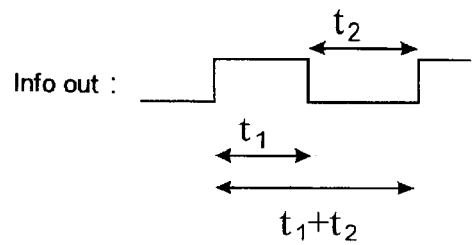
Figure 23:
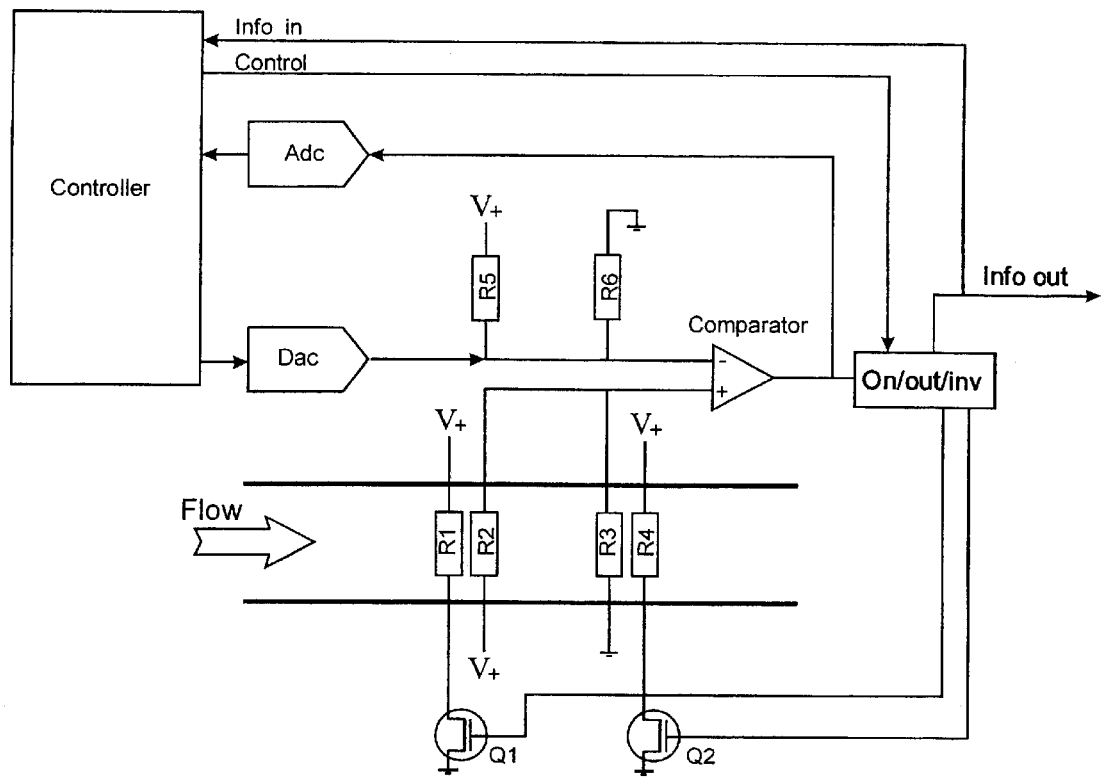
In FIG. 23, there is given a fourth embodiment of the electric circuit. This contains a device to have the offset as indicated in FIG. 14 removed using a controller. This figure, too, is extensively discussed hereinafter in the specification.

In FIG. 20 up to and including FIG. 23, there are given embodiments of the invention, the temperature difference of two objects in a medium flow being controlled. The objects always consist of a combination of two resistance elements which are in close thermal contact with one another. The resistance R1 and the resistance R2 together with their close thermal connection constitute an object which is considered as object R1#R2, and the resistances R3 and R4 together constitute an object which is considered as object R3#R4.

Due to the nature of the embodiment of the electric circuits shown in figures FIG. 20 up to and including 23, said circuits automatically start to oscillate with their own specific so-called freewheeling frequency.

The temperature-dependent resistances R2 and R3, which act as temperature sensors of the objects R1#R2 and R3#R4, are always included in a bridge circuit. The resistances have a positive temperature coefficient.

The resistance R1 constitutes the dissipator of the object R1#R2 and the resistance R4 constitutes the dissipator of the object R3#R4. By way of a comparator, the output signal of the aforementioned bridge circuit is assessed, and it is determined whether object R1#R2 has a higher or a lower temperature than object R3#R4. If object R1#R2 has a higher temperature than object R3#R4, the output of the comparator will be "low", and by way of the inverter the input of electronic switch Q2 will be "high" and will be opened. Due to this, resistance R4 will start to dissipate until the output signal of the bridge is inverted. At that point in time, the temperature of object R3#R4 is higher than the one of object R1#R2. The comparator will then invert once again and the output of the comparator will become "high". As a result, switch Q1 will be opened and resistance R1 will start to dissipate. Q2 will be closed and resistance R4 will stop to dissipate.

The circuit described will start to oscillate with a frequency determined by the time constants of the objects R1#R2 and R3#R4. The signal shape at the position "info out" in the circuit will have the form outlined in the figure. During $t_1$, resistance R1 will dissipate and during $t_2$, resistance R4 will dissipate. Since the two switches are identical and the dissipation resistances are provided with the same supply voltage, the momentary power dissipated will be equal for both resistances at the point in time on which a resistance dissipates. As a result, the period of time during which the switches are "on" is a direct measure of the average power dissipated in the resistances.

Herewith, the ratio of the time intervals $t_1/(t_1+t_2)$ is equal to the power ratio $P_1/(P_1+P_2)$ (see FIG. 18). Also, the ratio $(t_1-t_2)/(t_1+t_2)$ is equal to $(P_1-P_2)/(P_1+P_2)$ (see FIG. 19).

Figure 21:
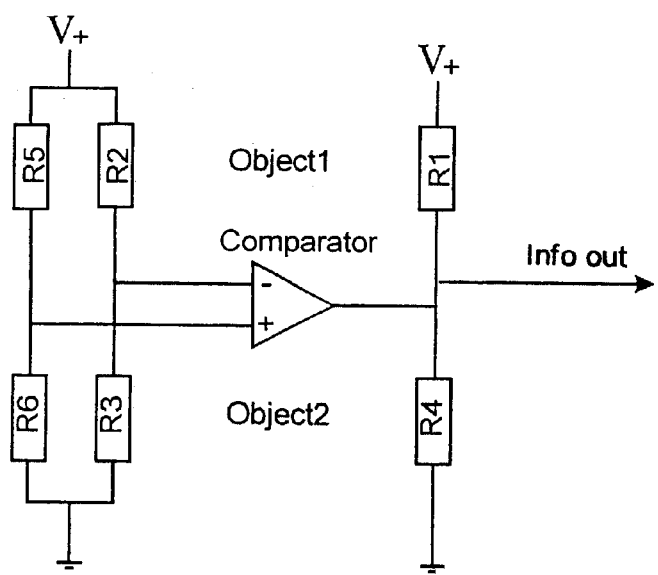
In FIG. 21, there is given a second embodiment of the electric circuit. This figure, too, is extensively discussed hereinafter in the specification.

In the embodiment shown in FIG. 21, the comparator directly controls the dissipator resistances R1 and R4, and the use of additional electric switches, such as Q1 and Q2 in FIG. 20, is avoided.

Figure 22:
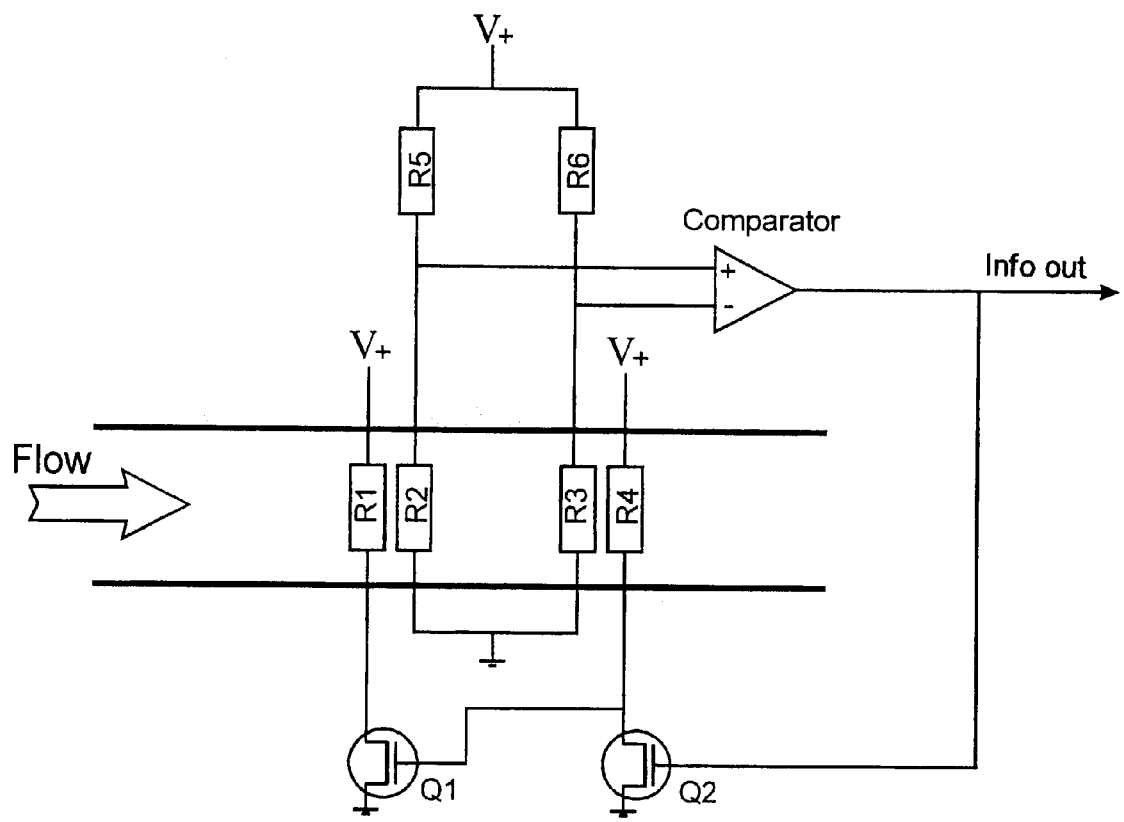
In FIG. 22, there is given a third embodiment of the electric circuit. This figure, too, is extensively discussed hereinafter in the specification.

The embodiment of the invention, as outlined in FIG. 22, is substantially similar to the embodiment of the invention as outlined in FIG. 20. Here, the use of the inverter circuit is avoided by directly coupling the electric switch Q1 to the output of switch Q2. For the rest, the functional operation of the electronic circuit in this embodiment is equal to the one shown in FIG. 20.

The other embodiment of the invention is shown in FIG. 23. This embodiment includes a (digital) controller circuit. By way of the "check" signal, the controller controls an on/off/inverter circuit.

This circuit includes two temperature sensors R2 and R3 in a (half) bridge circuit connected to the positive input of a comparator. The other half of the bridge circuit is formed by the resistances R5 and R6.

By way of the on/off-inverter circuit, the controller is capable of switching the electric switches Q1 and Q2 as shown in FIG. 20, but is also capable of simultaneously switching off both switches.

In the "off" state of both switches, the controller sets the circuit to a calibration state. At that moment, the device no longer acts as a flow meter. In this situation, neither of the objects will dissipate anymore, nor assume the temperature of the medium. After a certain time delay, in which the objects have physically acquired an equal temperature, the controller, using an analogue/digital converter and a digital/analogue converter circuit, may determine the calibration-offset value and store it an own memory.

In the calibration phase, the output of the comparator is monitored by an analogue/digital converter.

The digital/analogue converter injects a (small) offset flow into the negative input of the comparator. Using the digital/analogue converter, the controller controls the offset flow referred to earlier in such a manner that the comparator just inverts. The value of the offset flaws associated with this just inversion of the comparator is the calibration-offset value referred to in the invention.

Figure 25:
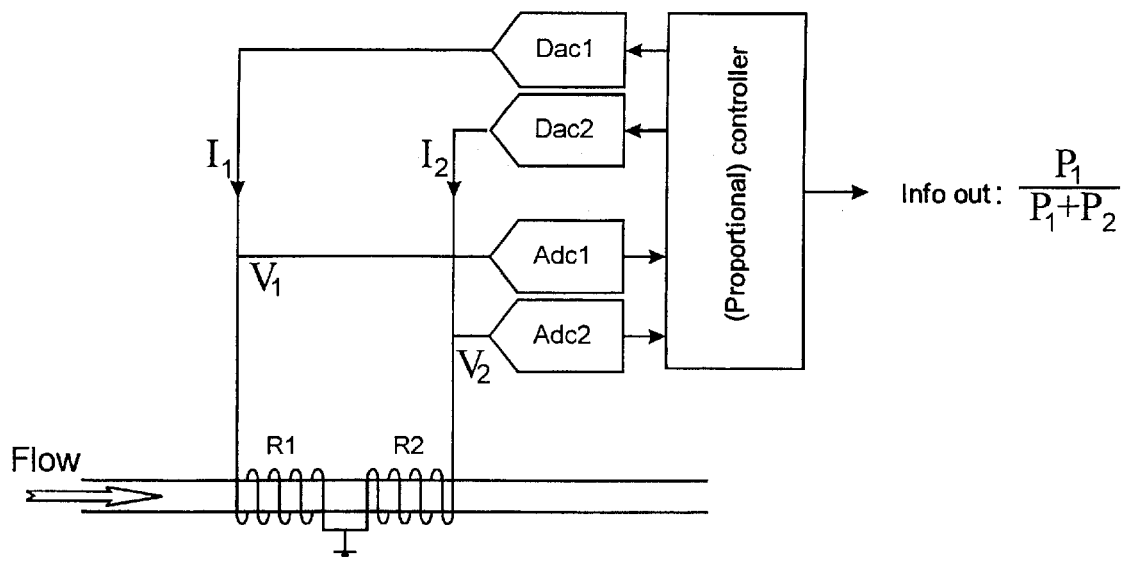
In FIG. 25, there is given a measuring device having two objects, where the medium now flows through the objects. The objects each consist of a temperature-dependent resistance which is capable of dissipating the object power $P_{gen}$ and which at the same time acts as a temperature sensor of the object in question. This figure is extensively discussed hereinafter in the specification.

An embodiment of the invention is shown in FIG. 25. Here, two temperature-dependent resistances are used as objects. By applying the electric flows $I_1,I_2$ and measuring the resulting voltages $V_1,V_2$, the controller knows the powers $(P_{gen1}=I_1*V_1)$ and $(P_{gen2}=I_2*V_2)$ dissipated and generated in the two objects. Also, the controller knows the temperature of both objects by simultaneously determining $V_1/I_1=R_1$ and $V_2/I_2=R_2$.

Drawn is a digital (possibly proportional) controller having two analogue/digital converters and two digital/analogue converters, but of course the controller may also be analogously designed, the converters being omitted.

Figure 26:
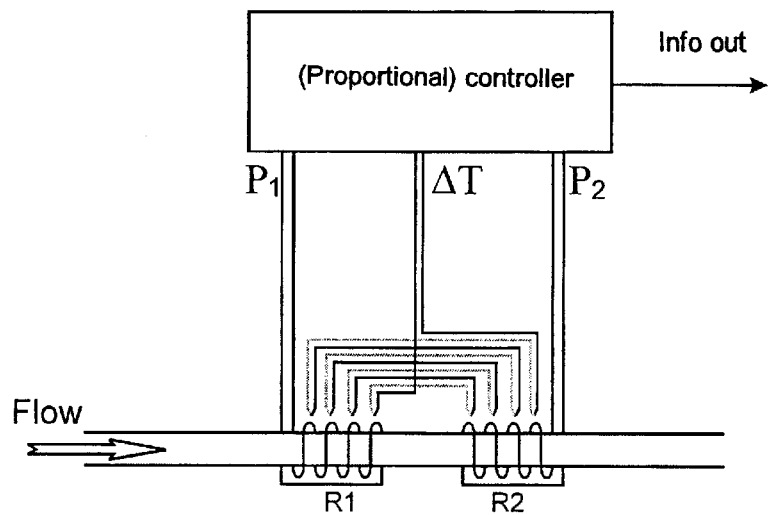
In FIG. 26, there is given a measuring device having two objects, where the medium now flows through the objects. The objects each consist of a resistance which is capable of dissipating the object power $P_{gen}$. The temperature difference between the two objects is measured using a series of thermocouples, or a thermopile. This figure is extensively discussed hereinafter in the specification.

Another embodiment of the invention is shown in FIG. 26. Here, the two objects consist of resistances on the one hand and thermocouple temperature sensors on the other.

Just as in FIG. 25, use is made here of resistances as dissipators for generating heat in the objects but, contrary to the embodiment of FIG. 25, there is made use of a thermopile as a sensor for the temperature difference between the two objects.

The power dissipated in the two resistances is controlled and calculated in the same way as for the embodiment of FIG. 25.

The thermopile directly generates a difference signal directly proportional to $T_1-T_2$: $\Delta T = \text{constant}*(T_1-T_2)$.

Both with the embodiment as shown in FIG. 25 and with the embodiment in FIG. 26, use is made of two objects whose mutual temperature difference is adjusted to zero.

Figure 27:
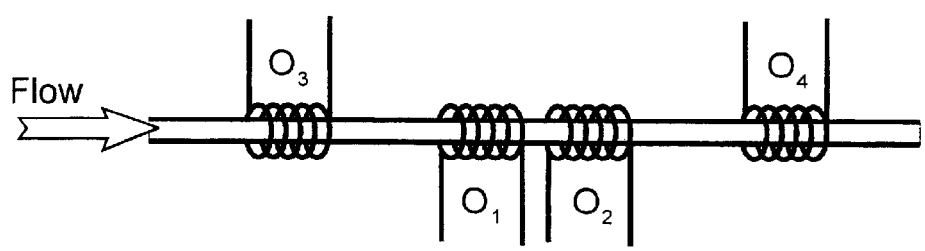
In FIG. 27, there is given a special embodiment of the measuring device as shown in FIG. 25.

In addition, in FIG. 27 there is given an embodiment of the medium flow meter in which two pairs of objects according to the invention are controlled.

In this embodiment of the flow-measuring device, bath the temperature difference between the objects $O_1$ and $O_2$ is adjusted to zero and the temperature difference between the objects $O_3$ and $O_4$ is adjusted to zero.

Figure 17:
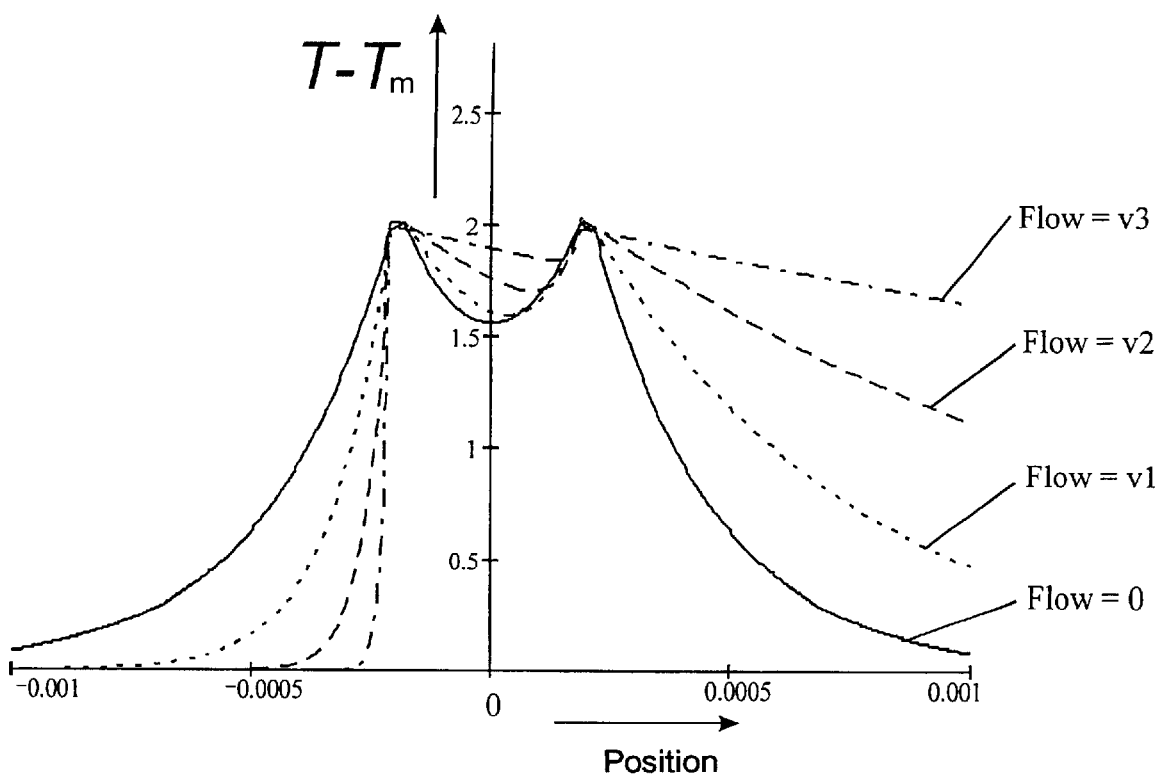
In FIG. 17, the temperature distribution as a function of the position is given for a measuring device such as the one shown in FIG. 15. The temperature distribution is given for four values of the flow (Flow=0, Flow=v1, Flow=v2, Flow=v3). The temperature of the two objects $O_1$ (15-2) and $O_2$ (15-3) is kept at a temperature difference of $T_1-T_2=0$ using a controller. Apart from this, the temperature of the two objects is also kept at a constant temperature with respect to the medium using a sensor $S_3$ (15-4) and a controller.

Both pairs of objects are adjusted by way of the CTA method (distribution as in FIG. 17). Here, the target temperature of both objects $O^1$ and $O_2$ lies at a fixed value over the value of the target temperature of the objects $O_3$ and $O_4$.

With the constant temperature of the objects $O_3$ and $O_4$, there may possibly be prevented asymmetric outside influences from the pair of objects $O_1, O_2$.

Figure 28:
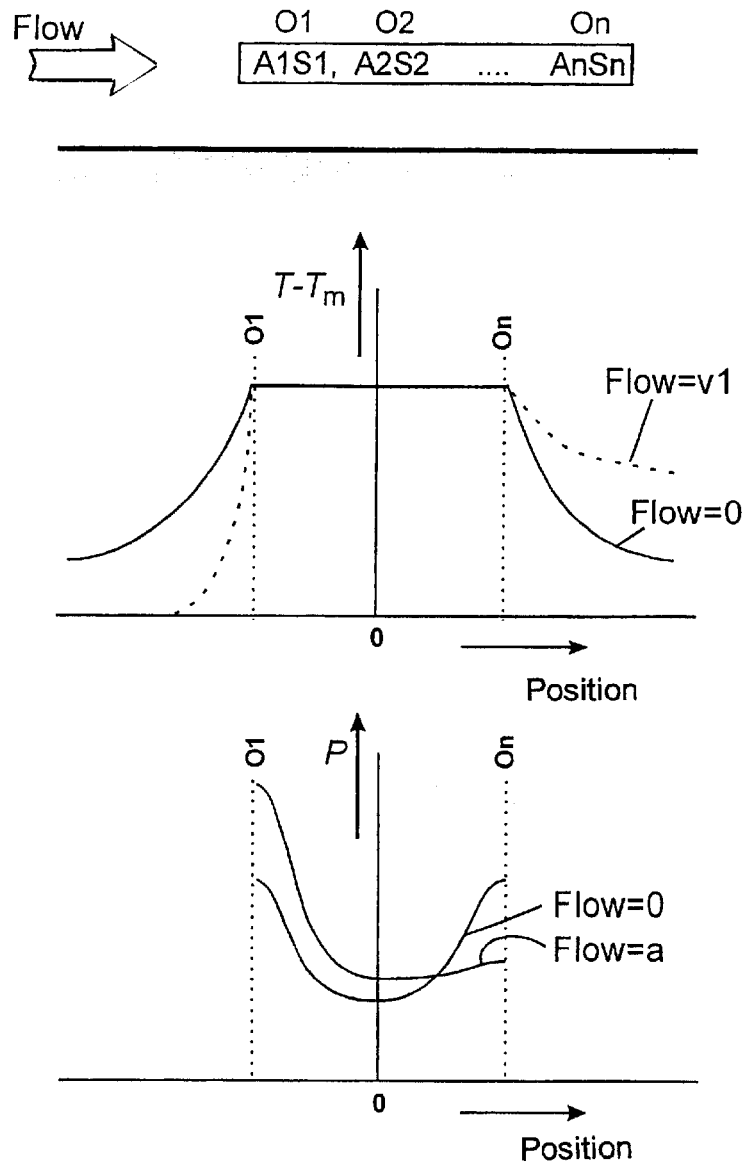
In FIG. 28, there is given a special embodiment of the invention having several objects. An advantage is the built-in redundancy. Should one of the dissipators and/or temperature sensors fail, the controller is capable of observing this and "switch off" the objects in question.

In an embodiment of the invention, such as the one shown in FIG. 28, there are included n/2 pairs of objects in a flow-measuring device. The temperature of all pairs of objects is adjusted, by way of the CTA method (see FIG. 17, inter alia), to a constant temperature by way of just as many controllers controlling the dissipation powers.

The resulting temperature distribution as a function of the position for two different flows is outlined in FIG. 28 (middle). The required total powers (always $P_1+P_2$ per controller) are shown in FIG. 28 (bottom). In this embodiment, there is built in a redundancy, so that a flow-measuring system consisting of n/2 combinations of the invention in the event of down time of one of the n/2 object-pair controller systems is designed in such a manner that it can continue to operate.

Figure 29:
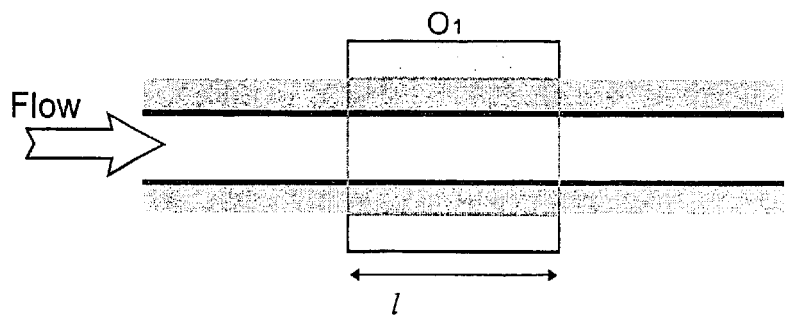
In FIG. 29, there is given an embodiment of a measuring device where the medium flows through the object.

In FIG. 29, there is indicated how an object $O_1$ may be constructed in such a manner that the object completely encloses the (flowing) medium. Also, the length 1 of the object $O_1$ in the direction of the tubular construction is chosen is such a manner that the temperature of the medium at the position of $O_1$ becomes equal to the object temperature $T_1$ measured. In this situation, use is made of a completely developed temperature profile in the direction perpendicular to the tubular construction.

Figure 30:
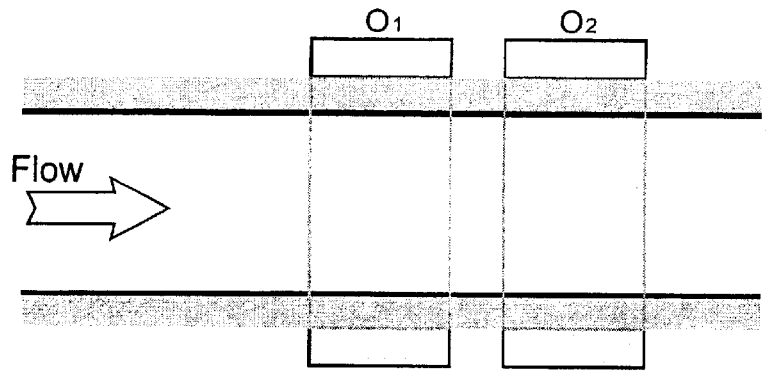
In FIG. 30, there is given an embodiment of a measuring device based on the invention where the medium flows through two objects.

In FIG. 30, two objects are mounted around the tubular construction. The length of the objects is such that there comes into existence a completely developed temperature profile (cf. FIG. 25 and FIG. 26).

Figure 31:
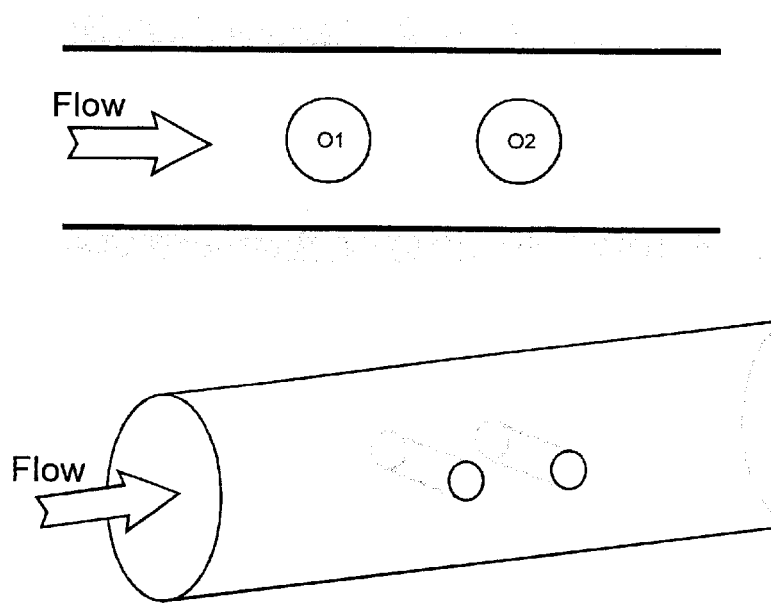
In FIG. 31, there is given an embodiment of a measuring device based on the invention where the medium flows through a tubular construction in which the two aforementioned objects are located.

In FIG. 31 (top) there is given a cross section of two objects in a flowing medium. In FIG. 31 (bottom), there is indicated in which way two tubular objects may be constructed in the direction perpendicular to another tubular construction enclosing the medium.

Figure 32:
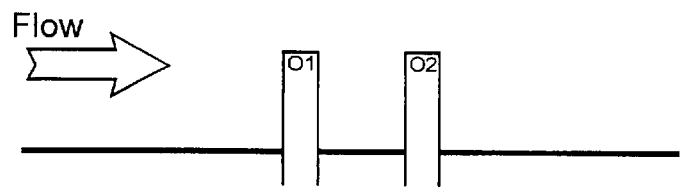
In FIG. 32, there is given an embodiment of a measuring device based on the invention where the medium flows through a tubular construction in which there are located the two aforementioned objects which are inserted into the tubular construction as a probe.

In FIG. 32, there is given a cross section of an embodiment in which the two objects are each configured on a kind of probe construction.

FIG. 33, there is given an embodiment in which the two objects are separated from the medium by a (thin) partition. Said partition may be made of, e.g., stainless steel.

Said embodiment of two objects, as given in FIG. 33, may be included in the sidewall of a tubular construction, as given in FIG. 35. The embodiment of two objects as given in FIG. 33 may be included in the front side of a "probe" construction, i.e., in a tubular construction as given in FIG. 34.

In FIG. 37, there is given a plan view of the embodiment. The outer it dimensions are 1 millimeter by 2 millimeters. There are two object, consisting of a beam, which are suspended freely above a depression etched out. Each object or beam supports two resistances. The length of the objects in the plan view of FIG. 37 is 1 mm.

In FIG. 36, there is drawn a cross section of said embodiment of the two objects. The dimensions of the two objects in the cross section are 1 micrometer thick and 40 micrometers long in the flow direction.

A cross section of an embodiment of the invention is shown in FIG. 38. Four resistance tracks on a synthetic carrier, two by two form an object which may be controlled as explained earlier (with FIG. 14).

The figures FIGS. 39a and 39b show substantially equal structures, use being made of a wide depression over which there are extended beams. On each beam, there lie one or more resistances.

REFERENCES

[R1] H. H. Bruun, "Hot wire anemometry, principles and signal analysis", Oxford University Press, Oxford, 1995.
[R2] U.S. Pat. No. : 4,651,564, R. G. Johnson and R. E. Higashi, "Semiconductor device".
[R3] T. S. J. Lammerink et al., "Micro-Liquid Flow Sensor", Sensors and Actuators A, 37–38, (1993), pp. 45–50.
[R4] H. J. Verhoeven, "Smart Thermal Flow Sensors", Thesis, 1995, Delft University.
[R5] U.S. Pat. No,: 5,036,701, F. van der Graaf, "Mass-flow meter with temperature sensors".
[R6] H-E. de Bree et al., "The microflown, a novel device measuring acoustical flows", Sensors and Actuators, S&A54/1–3, pp. 552–557.
[R7] H-E. de Bree, "The Microflown", Thesis, 1997, ISBN 9036509262, Twente University, Enschede.
[R8] A. F. P. van Putten: "A constant voltage constant current Wheatstone bridge configuration", Sensors and Actuators, 13 (1988), pp. 103–115.
[R9] U.S. Pat. No. : 4,548,077, A. F. P. van Putten, "Ambient temperature compensated double bridge anemometer".
[R10] U.S. Pat. No. : 5,064,296, J. H. Huijisng and F. R. Riedijk, "Integrated semiconductor circuit for thermal measurements".

What is claimed is:

1. A device for measuring a physical parameter of a medium, said device comprising:

two measuring objects spaced apart at a predetermined distance, each one of said two measuring objects comprising a dissipator arranged in thermal contact with a flowing medium whose physical parameter is to be measured;

a single control circuit for bringing a temperature difference between said two measuring objects repeatedly towards zero, said circuit including means for determining which one of said two measuring objects is a colder measuring object and means for supplying electric power to said dissipator of said colder measuring object until said colder measuring object is a hotter measuring object and thereafter supplying electric power to said dissipator of an other one of said two measuring objects which is now the colder measuring object until said other one of said two measuring objects is the hotter measuring object;

means for determining the electric power supplied to each of said two measuring objects during at least one heating cycle; and means for calculating the physical parameter based on a ratio of the electric power determined from each of said two measuring objects.

2. The device according to claim 1 wherein the physical parameter is one of flow rate, density and specific heat.

3. The device according to claim 2, wherein the device measures the flow rate and the flow rate is measured in more than one direction.

4. The device according to claim 1, further comprising:

at least a third measuring object and at least a fourth measuring object, and means for adjusting a temperature difference between said third and fourth measuring objects towards zero.

5. The device according to claim 1, wherein a total sum of the supplied electric power is constant.

6. The device according to claim 1, wherein a temperature of the measuring objects is constant with respect to a temperature of the environment.

7. The device according to claim 1, wherein said dissipator of each said measuring object is integral with a respective temperature sensor.

8. The device according to claim 7, wherein said means for alternately supplying electric power and said means for measuring temperature difference implement an ω→3ω method.

9. The device according to claim 1, wherein the means for measuring the temperature difference between the objects comprises one of a thermocouple and a thermopile.

10. The device according to claim 1, wherein said means for measuring the temperature difference between the objects comprises a sensor having a temperature dependent resistance.

11. The device according to claim 1, wherein the device is on a semiconductor chip.

12. The device according to claim 11, wherein the chip is silicon based.

13. The device according to claim 1, wherein the device is bidirectionally sensitive.

14. The device according to claim 1, wherein the device is used in a system and further comprises:
   means for self-diagnosis to determine stability of the system based on an assessment of said signal control circuit; and
   means for detecting failure of one of said dissipators.

15. The device according to claim 1, wherein said means for alternately supplying electric power comprises a single power supply that supplies power to said dissipators of said two measuring objects.

16. A device according to claim 1, wherein the ratio is $P_1/P_1+P_2$, wherein P1 is a first determined electric power and $P_2$ is a second determined electric power.

17. A device according to claim 1, wherein the ratio is $P_1-P_2/P_1+P_2$ wherein $P_1$ is a first determined electric power and $P_2$ is a second determined electric power.

18. A device for measuring a physical parameter of a medium, said device comprising:
   two measuring objects spaced apart at a predetermined distance, each one of said two measuring objects comprising a dissipator arranged in thermal contact with a flowing medium whose physical parameter is to be measured;
   a single control circuit for bringing the temperature difference between said two measuring objects repeatedly towards zero, said circuit, including means for determining which one of said two measuring objects is a colder measuring object and means for supplying electric power to said dissipator of said colder measuring object until said colder measuring object is a hotter measuring object and thereafter supplying electric power to said dissipator of an other one of said two measuring objects which is now the colder measuring object until said other one of said two measuring objects is the hotter measuring object;
   means for determining the electric power supplied to each of said two measuring objects during at least one heating cycle; and
   means for calculating the physical parameter based on an asymmetry in the determined powers.

19. A device for measuring a physical parameter of a medium, said device comprising:
   two measuring objects spaced apart at a predetermined distance, each one of said two measuring objects comprising a dissipator arranged in thermal contact with a flowing medium whose physical parameter is to be measured;
   a single control circuit for bringing a temperature difference between said two measuring objects repeatedly towards zero, said circuit, including means for determining which one of said two measuring objects is a hotter measuring object and means for supplying electric power to said dissipator of said hotter measuring object until said hotter measuring object is a colder measuring object and thereafter supplying electric power to said dissipator of another one of said measuring objects which is now the hotter measuring object until said other one of said measuring objects is the colder measuring object;
   means for determining the electric power supplied to each of said measuring objects during at least one heating; and
   means for calculating the physical parameter based on a ratio of the electric power determined from each of said two measuring objects.

* * * * *

UNITED STATES PATENT AND TRADEMARK OFFICE
CERTIFICATE OF CORRECTION

PATENT NO. : 6,370,950 B1
DATED : April 16, 2002
INVENTOR(S) : Theodorus Simon Joseph Lammerink It is certified that error appears in the above-identified patent and that said Letters Patent is hereby corrected as shown below:

Title page,
Insert Item [30] as follows:

-- [30]      Foreign Application Priority Data
  March 20, 1998   [NL]   Netherlands .................. 1008665 --.

Signed and Sealed this

Seventeenth Day of September, 2002

Attest:

Attesting Officer

JAMES E. ROGAN
*Director of the United States Patent and Trademark Office*